T. R. ARDEN.
DENTAL CROWN POST EXTRACTOR.
APPLICATION FILED MAR. 25, 1914.

1,102,850.

Patented July 7, 1914.

Inventor
THOMAS RAYMOND ARDEN,
BY
*Attorney*

UNITED STATES PATENT OFFICE.

THOMAS RAYMOND ARDEN, OF PHILADELPHIA, PENNSYLVANIA, ASSIGNOR TO THE S. S. WHITE DENTAL MANUFACTURING COMPANY, A CORPORATION OF PENNSYLVANIA.

DENTAL CROWN-POST EXTRACTOR.

1,102,850.  Specification of Letters Patent.  Patented July 7, 1914.

Application filed March 25, 1914.  Serial No. 827,108.

*To all whom it may concern:*

Be it known that I, THOMAS RAYMOND ARDEN, a citizen of the United States, and a resident of the city of Philadelphia, county of Philadelphia, and State of Pennsylvania, have invented certain new and useful Improvements in Dental Crown-Post Extractors, of which the following is a specification, reference being had to the accompanying drawings.

My invention relates particularly to implements for extracting dental crown-posts from tooth roots, and to the method of preparing such crown-posts so as to be readily and securely engaged by the extractor.

In crowning a tooth it is the usual practice to provide a crown with a pin or post having one end embedded therein and the other end projecting into a suitably prepared cavity in the natural tooth root, in which it is cemented, and, obviously, undue pressure upon the crown so fractures the crown-post that it may be accidentally broken off flush with, or sometimes below, the ground surface of the natural tooth root, and therefore is very difficult to extract from its embedded position in said tooth root, for the purpose of replacing it with a new crown-post, without cutting away a portion of the body of said root.

The principal object of my invention is to provide a crown-post extractor that may be securely attached to any crown-post without cutting away or removing any portion of the natural tooth body, and that may be conveniently manipulated to withdraw the crown-post without danger of fracturing said tooth body, and without pain, annoyance, or inconvenience to the patient.

Other objects of my invention are, to provide a crown-post extractor with a member which may be securely connected in threaded relation with a crown-post to be extracted; and to provide means for forcing said member and the attached crown-post from the tooth root.

My invention comprehends a crown-post extractor having a threaded stem arranged to be connected in threaded engagement with a crown-post which is embedded in a natural tooth root, and provided with a thumb-nut arranged to be supported by the ground surface of the said tooth root, against which it is forced when rotated to effect the withdrawal of said crown-post.

My invention further includes all of the various novel features of construction and arrangement as hereinafter more definitely specified.

Figure 1:
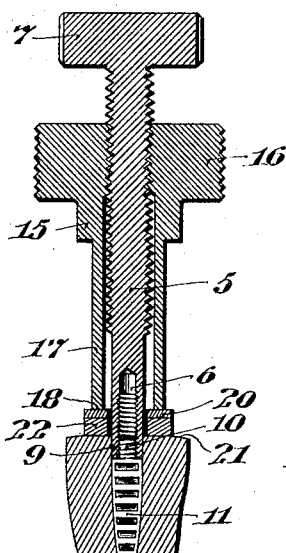
Figure 2:
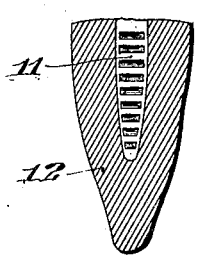
Figure 3:
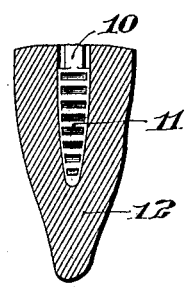
Figure 4:
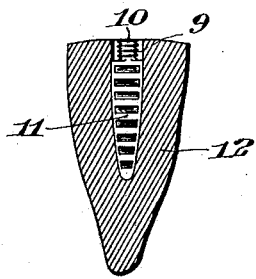

In the accompanying drawings, Figure 1 is a central vertical sectional view of a convenient embodiment of my improved extractor as applied to an embedded broken crown-post; Fig. 2 is a central vertical sectional view of a natural tooth root having a broken pin embedded therein; Fig. 3 is a view similar to Fig. 2, but showing a shank formed on said pin; Fig. 4 is a view similar to Figs. 2 and 3, showing the shank threaded to receive the threaded socket of the crown-post extractor.

The device shown in Fig. 1 comprises the externally threaded stem 5 having the internally threaded socket 6, and is provided with the head 7 which may be conveniently milled so as to be readily rotated by the operator to engage it with the threads 9 of the shank 10 formed on the crown-post 11, which is embedded in the natural tooth root 12. The stem 5 is provided with a thumb-nut 15, which is in threaded engagement with the exterior threads of said stem, and which comprises the milled head 16 and the cylindrical extension 17. The lower edge 18 of said extension 17 is arranged to engage a suitable washer 20, preferably formed of metal, between which and the ground surface 21 of the natural tooth root may be interposed a washer 22 of yielding material, such as rubber. Said washer 22 distributes upon the natural tooth root any strain incident to the rotation of the thumb-nut 15, in a direction tending to force the stem 5 outwardly from said natural tooth root, which movement of said stem effects the withdrawal of the crown-post 11 from its embedded position in said root.

The operation of withdrawing the crown-post from the tooth root may be effected as follows:—When the crown-post 11 is broken off substantially flush with the ground face 21 of the tooth root 12, as shown in Fig. 2, said post may be provided with the shank 10, as shown in Fig. 3, by any suitable form of milling cutter whose external diameter does not exceed the width of the crown-post 11, whereby the milling operation simply cuts away a portion of the metal of the crown-post to form the shank 10, which, as best shown in Fig. 4, may be provided with screw-threads 9 by any suitable thread-cutting die whose external diameter does not exceed the width of the crown-post 11. Having thus provided the shank 10 with screw-threads 9, the post may be engaged with the internally threaded socket 6 of the stem 5 by rotating said stem thereon to the position shown in Fig. 1, wherein it forms a substantially integral part thereof, whereupon the nut 15 may be rotated upon the stem 5 until it engages the ground surface of the natural tooth root, preferably having the washers 20 and 22 interposed to insure an even distribution of the pressure upon said natural tooth root. A further rotation of said nut obviously effects the withdrawal of the broken post from an embedded position in the root. It may be here noted that should the natural tooth root have its ground surface disposed in angular relation to the axis of the pin or post, the washers 20 or 22 may be so shaped as to afford a bearing surface normal to the axis of said pin for the engagement of the lower or free bearing edge of the thumb-nut 15; in other words, either or both of these washers may be thicker upon one side than upon the other, or wedge-shaped. In some instances the washers may be entirely omitted and the bearing edge of said nut 15 be caused to bear directly upon the ground surface of the tooth root.

It is to be understood that while I have described my extractor as being particularly applicable in the extraction of crown-posts from tooth roots, without cutting away any of the tooth body, it is obvious that it may as readily be employed in extracting broken drills, burs, etc., without cutting away any of the surrounding body in which they may be embedded.

I do not desire to limit my invention to the precise details of construction and arrangement herein set forth, as it is obvious that various modifications may be made therein without departing from the essential features of my invention as defined in the appended claims.

Having thus described my invention, I claim:

1. A crown-post extractor comprising a member having threaded means for engaging a crown-post embedded in a tooth, and means for forcing said member from the tooth and thereby withdrawing said crown-post.

2. A crown-post extractor comprising a member having an internally threaded socket arranged to engage a crown-post embedded in a tooth, and means tending to bear upon said tooth to force said member from said tooth and thereby withdraw said crown-post.

3. A crown-post extractor comprising a member having an internally threaded socket for engaging a crown-post embedded in a tooth, and means connected with said member and movably supported upon said tooth to force said member from said tooth and withdraw said crown-post.

4. A crown-post extractor comprising a member having an internally threaded socket arranged to be engaged with said crown-post in threaded relation therewith, and means rotatably connected with said member arranged to force it from said tooth and thereby withdraw said crown-post.

5. A crown-post extractor comprising an externally threaded stem having an internally threaded socket arranged to be engaged in threaded relation with a crown-post embedded in a tooth, and a nut rotatably engaged with said external screw-threads, rotatable thereon to force said stem from said tooth and thereby withdraw said crown-post.

In witness whereof, I have hereunto set my hand this 24th day of March, A. D., 1914.

THOMAS RAYMOND ARDEN.

Witnesses:
 HARRY R. BARBER,
 CLIFTON C. HALLOWELL.

---

Copies of this patent may be obtained for five cents each, by addressing the "Commissioner of Patents, Washington, D. C."